United States Patent
Chen et al.

(10) Patent No.: US 8,878,816 B2
(45) Date of Patent: Nov. 4, 2014

(54) ACTIVE PIXEL SENSOR AND METHOD FOR MAKING SAME

(75) Inventors: Chung-Chun Chen, Hsinchu (TW); Yu-Hsuan Li, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 1180 days.

(21) Appl. No.: 12/378,925

(22) Filed: Feb. 19, 2009

(65) Prior Publication Data

US 2010/0207889 A1   Aug. 19, 2010

(51) Int. Cl.
| | |
|---|---|
| G06F 3/042 | (2006.01) |
| G06F 3/038 | (2013.01) |
| H04N 3/14 | (2006.01) |
| G06F 3/041 | (2006.01) |
| G02F 1/1333 | (2006.01) |
| G02F 1/133 | (2006.01) |

(52) U.S. Cl.
CPC .......... *G06F 3/0412* (2013.01); *G02F 1/13338* (2013.01); *G02F 2001/13312* (2013.01); *G06F 3/042* (2013.01)
USPC ............................. 345/175; 345/207; 348/301

(58) Field of Classification Search
CPC ....... G06F 3/041; G06F 3/0412; G06F 3/042; G06F 3/0421; H03K 17/9627
USPC ........... 345/81, 104, 173, 175–176, 182–183, 345/207; 250/200, 208.1–208.3; 315/169.3; 348/294, 300–301, 308; 257/291–292
See application file for complete search history.

(56) References Cited

U.S. PATENT DOCUMENTS

| | | | |
|---|---|---|---|
| 4,345,248 A | 8/1982 | Togashi et al. | |
| 5,204,661 A * | 4/1993 | Hack et al. ...................... 345/88 |
| 5,892,541 A | 4/1999 | Merrill et al. ................. 348/302 |
| 5,923,369 A | 7/1999 | Merrill et al. ................. 348/300 |
| 5,962,844 A | 10/1999 | Merrill et al. ................. 250/214 |
| 6,097,022 A | 8/2000 | Merrill et al. ................. 250/208 |
| 6,410,899 B1 | 6/2002 | Merrill et al. ................. 250/208 |

(Continued)

FOREIGN PATENT DOCUMENTS

| | | |
|---|---|---|
| CN | 101281446 A | 10/2008 |
| JP | 56085792 | 7/1981 |

(Continued)

OTHER PUBLICATIONS

A CG Silicon System LCD with Optical Input Function, C.Brown, H. Kato, K. Maeda and B. Hadwen, Sharp Corporation, 2613-1 Ichinomoto-cho, Tenry-Shi, Nara 632-8527 Japan, IDW 2007.

(Continued)

*Primary Examiner* — Joe H Cheng
*Assistant Examiner* — Keith Crawley

(57) ABSTRACT

A touch panel includes a plurality of active pixel sensors arranged in an array to sense a touch event. Each sensor element includes a photo-sensing element coupled to a single amplifier. The sensor element is arranged to provide a sensing voltage indicative of a light level received by the photo-sensor in a sensing period. The sensing voltage is amplified by the amplifier into an output voltage in the sensing period. Following the sensing period, the output voltage and the sensing voltage are reset to a predetermined voltage level. Following the reset period, the photo-sensor as well as the amplifier is disabled for a period so that the sensing level is caused to drop below the predetermined voltage level.

18 Claims, 8 Drawing Sheets

(56) References Cited

U.S. PATENT DOCUMENTS

| | | | |
|---|---|---|---|
| 6,501,064 B2 | 12/2002 | Kole | 250/280.1 |
| 6,600,160 B2 | 7/2003 | Kobayashi et al. | 250/370.14 |
| 6,653,636 B2 * | 11/2003 | Busse et al. | 250/370.09 |
| 7,087,881 B2 | 8/2006 | Kusuda | 250/214 |
| 7,158,129 B2 | 1/2007 | Nakajima | 345/207 |
| 2001/0000068 A1 * | 3/2001 | Isogai et al. | 257/443 |
| 2005/0040320 A1 * | 2/2005 | Lule et al. | 250/214 R |
| 2006/0108511 A1 * | 5/2006 | Cok et al. | 250/214 R |
| 2006/0262055 A1 | 11/2006 | Takahara | 345/81 |
| 2007/0268206 A1 | 11/2007 | Kinoshita et al. | 345/30 |
| 2009/0147191 A1 * | 6/2009 | Nakajima et al. | 349/116 |
| 2009/0289920 A1 | 11/2009 | Chiang et al. | 345/175 |

FOREIGN PATENT DOCUMENTS

| | | |
|---|---|---|
| JP | 11-307756 A | 11/1999 |
| JP | 2003-131798 A | 5/2003 |
| JP | 2003-521715 A | 7/2003 |
| JP | 2004-48438 A | 2/2004 |
| JP | 2007-310628 A | 11/2007 |
| WO | WO 01/57554 A2 | 8/2001 |

OTHER PUBLICATIONS

Japanese Office Action dated Nov. 8, 2011 in the corresponding Japanese application 2010-002639.

Office Action issued on Dec. 4, 2012 in corresponding Japanese application, No. 2010-002639 (2 pages).

* cited by examiner

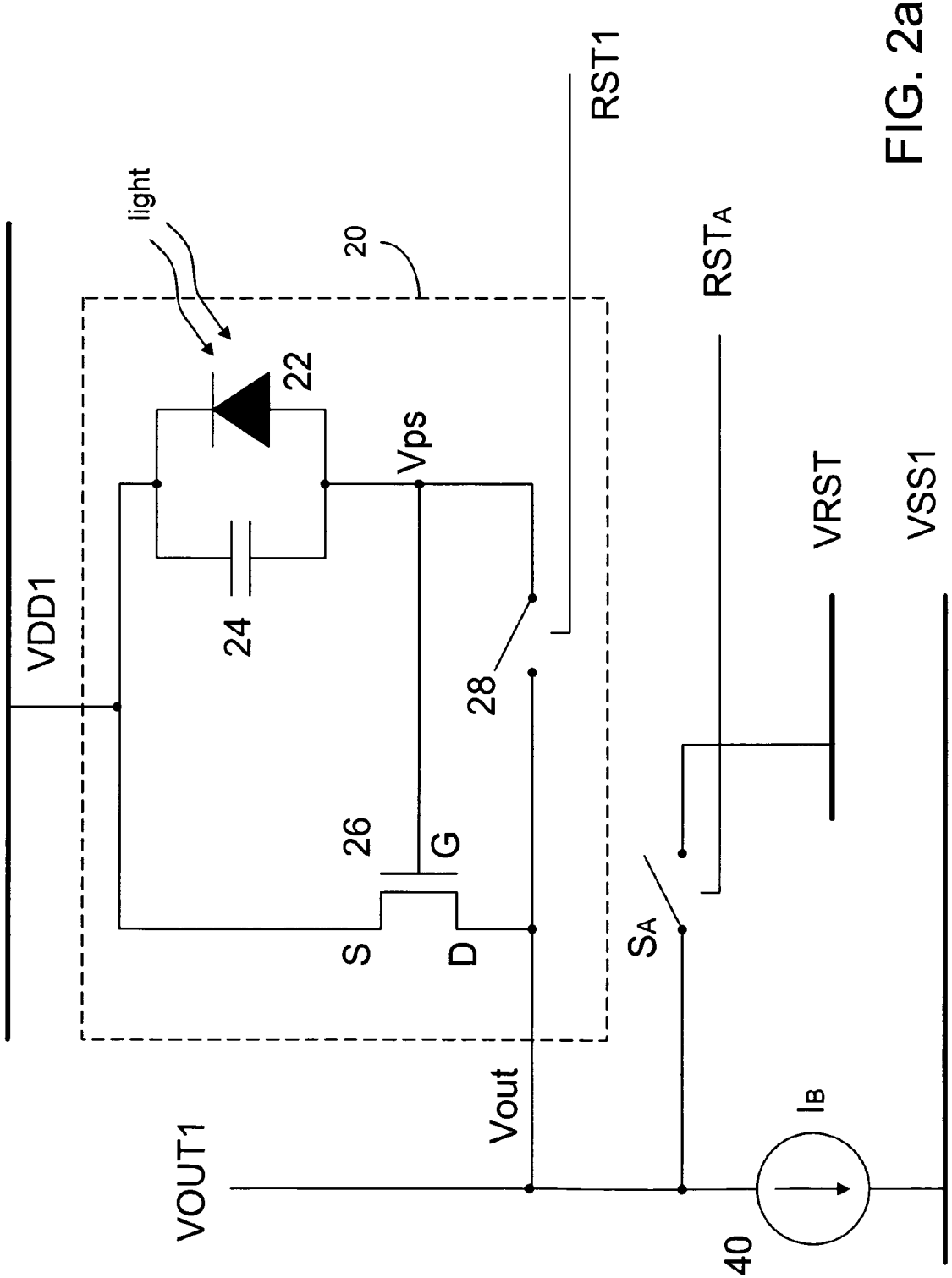

ACTIVE PIXEL SENSOR AND METHOD FOR MAKING SAME

FIELD OF THE INVENTION

The present invention relates generally to touch sensor array and, more particularly, to an active pixel sensor.

BACKGROUND OF THE INVENTION

As low temperature poly-silicon (LTPS) technology becomes mature, it would be advantageous to fabricate touch sensors along with driving circuits on a glass substrate using LTPS technology. As the term suggests, an APS is different from a passive pixel sensor (PPS) in that a sensor element in an APS has an active amplifier, such as a thin-film transistor (TFT) to amplify the sensed signal by a photo-sensor. As a result, the signal-to-noise ratio in an APS is significantly increased. The main disadvantage of an APS over a PPS is that each of the sensing elements in the APS has more electronic components, rendering it more difficult to reduce the size of the sensing elements.

It is thus advantageous to provide a method for producing an APS wherein in the number of electronic components in a sensor element is relatively low.

SUMMARY OF THE INVENTION

The present invention provides a touch panel having a plurality of active pixel sensors arranged in an array to sense a touch event. Each sensor element includes a photo-sensing element coupled to a single amplifier. The sensor element is arranged to provide a sensing voltage indicative of a light level received by the photo-sensor in a sensing period. The sensing voltage is amplified by the amplifier into an output voltage in the sensing period. Following the sensing period, the output voltage and the sensing voltage are reset to a predetermined voltage level. Following the reset period, the photo-sensor as well as the amplifier is disabled for a period so that the sensing level is caused to drop below the predetermined voltage level.

Thus, the first aspect of the present invention is a sensor element for use in a touch panel. The sensor element include an amplifier having a first amplifier end, a second amplifier end and a control end, the first amplifier end connected to a first voltage source, the second amplifier end operatively connected to a voltage output, wherein the second amplifier end is configured for connection to a current source; and a photosensing element having a first element end operatively connected to the first voltage source, and a second element end operatively connected to the control end of the amplifier, wherein the voltage output is operatively connected to a resetting element for resetting the voltage output to a predetermined reset voltage. The sensor element further includes a first switching element connected between the second element end and the second amplifier end, the switching element operable in a conducting state and a non-conducting state for achieving the switching. The resetting element includes a second switching element operable in a conducting state and a non-conducting state such that when the first switching element is operated in the conducting state, the second switching element is also operated in the conducting state. The amplifier can be a transistor, for example.

According to various embodiments of the present invention, the sensor element further comprises a capacitor connected between the first element end and the second element and of the photosensing element, wherein the photosensing element comprises a photodiode connected between the first element end and the second element end, and a capacitor connected in parallel with the photodiode.

The second aspect of the present invention is a touch panel having a plurality of sensing elements as described above. The touch panel has a plurality of voltage outputs from the sensing elements. The voltage outputs are conveyed to a sensing circuit for measurement in order to determine the location of a touch event. According to the present invention, the sensing circuit has means for measuring the voltage output of each of the sensor elements.

The third aspect of the present invention is a method of touch sensing. The method comprises arranging a plurality of sensor elements in a touch panel;

providing a photo-sensor in each of the sensor elements, the photo-sensor arranged to provide a sensing voltage indicative of a light level received by the photo-sensor in a sensing period;

amplifying the sensing voltage in the sensor element for providing an output voltage indicative of the sensing voltage in the sensing period; and resetting the output voltage to a predetermined voltage level in a reset period following the sensing period.

According to various embodiments of the present invention, the method further comprises resetting the sensing voltage to the predetermined voltage level in the reset period.

According to various embodiments of the present invention, the method further comprises disabling the photo-sensor in an off-period following the reset period so as to cause the sensing voltage to drop below the predetermined voltage level.

The fourth aspect of the present invention is an integrated touch panel wherein the touch sensing elements are provided on a display panel. In a display panel that has an array of pixels organized in pixel rows and columns and uses a plurality of gate-line signals to control the pixel rows, it is possible to use at least some of the gate-line signals as the voltage supply signals to the rows sensing elements in the touch panel.

The present invention will become apparent upon reading the description taken in conjunction with FIGS. 1 to 6b.

BRIEF DESCRIPTION OF THE DRAWINGS

FIG. 2a shows the electronic components in a sensor element in the APS, according to one embodiment of the present invention.

DETAILED DESCRIPTION OF THE INVENTION

Figure 1:
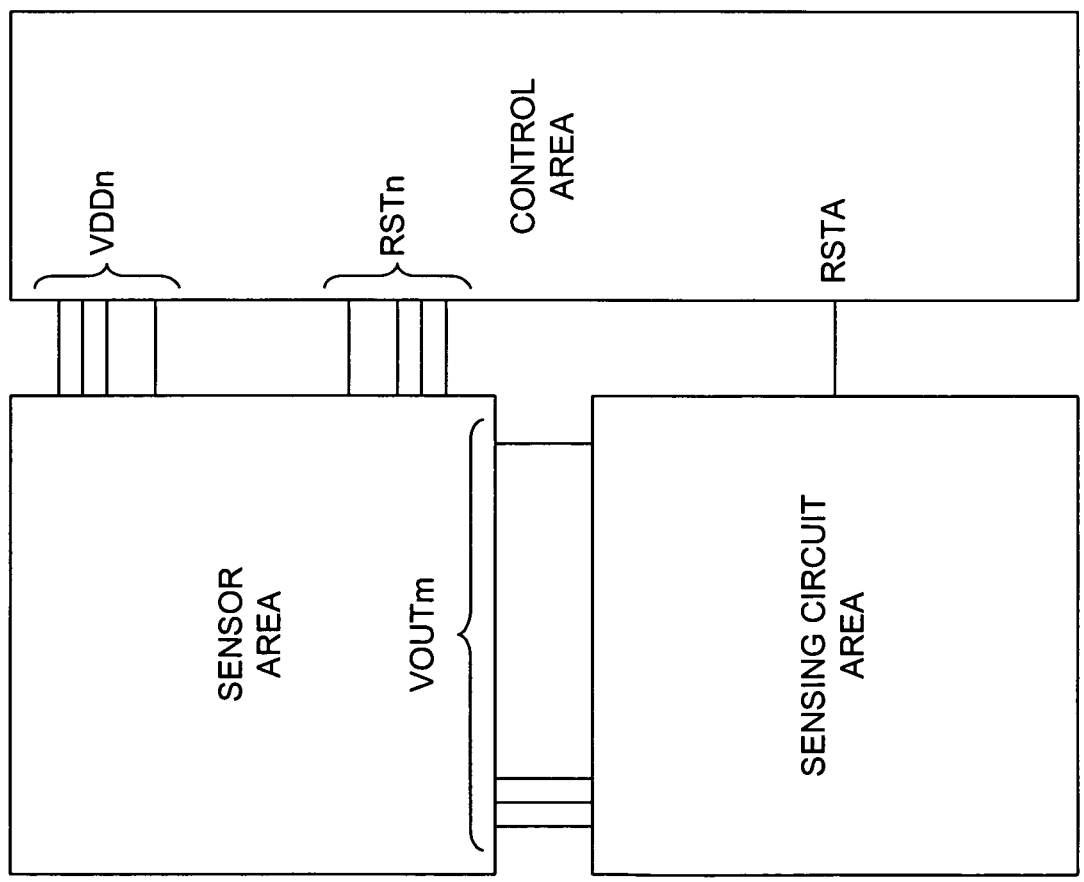
FIG. 1 shows an overall layout of an APS, according to the present invention.

An active pixel sensor, according to embodiments of the present invention, can be divided into three areas: a sensor area, a sensing circuit area and a control area, as illustrated in FIG. 1. The sensor area comprises an array of sensor elements (see FIG. 3) to detect the light distribution on a touch screen. The sensed signals from the sensor array are transferred to the sensing circuit area for processing. The control area can be used to control the transfer of the sensed signals from the sensor array to the sensing circuit area, to reset the sensing elements, and to control the supply voltage to the sensing elements, for example. The sensor area, the sensing circuit area and the control area can be fabricated on a single substrate as an integrated circuit. At least part or all of the integrated circuit can be fabricated with low temperature polysilicon (LTPS) on a glass substrate, for example. However, the active pixel sensor can be fabricated with other materials and on a different substrate.

In a display panel, such as a liquid crystal display (LCD), a light-emitting diode (LED) display, it is possible to integrate the sensor area onto the display panel.

The present invention is mainly concerned with the sensor area and, more particularly, with the electronic components and the electronic circuit in a sensor element.

Figure 3:
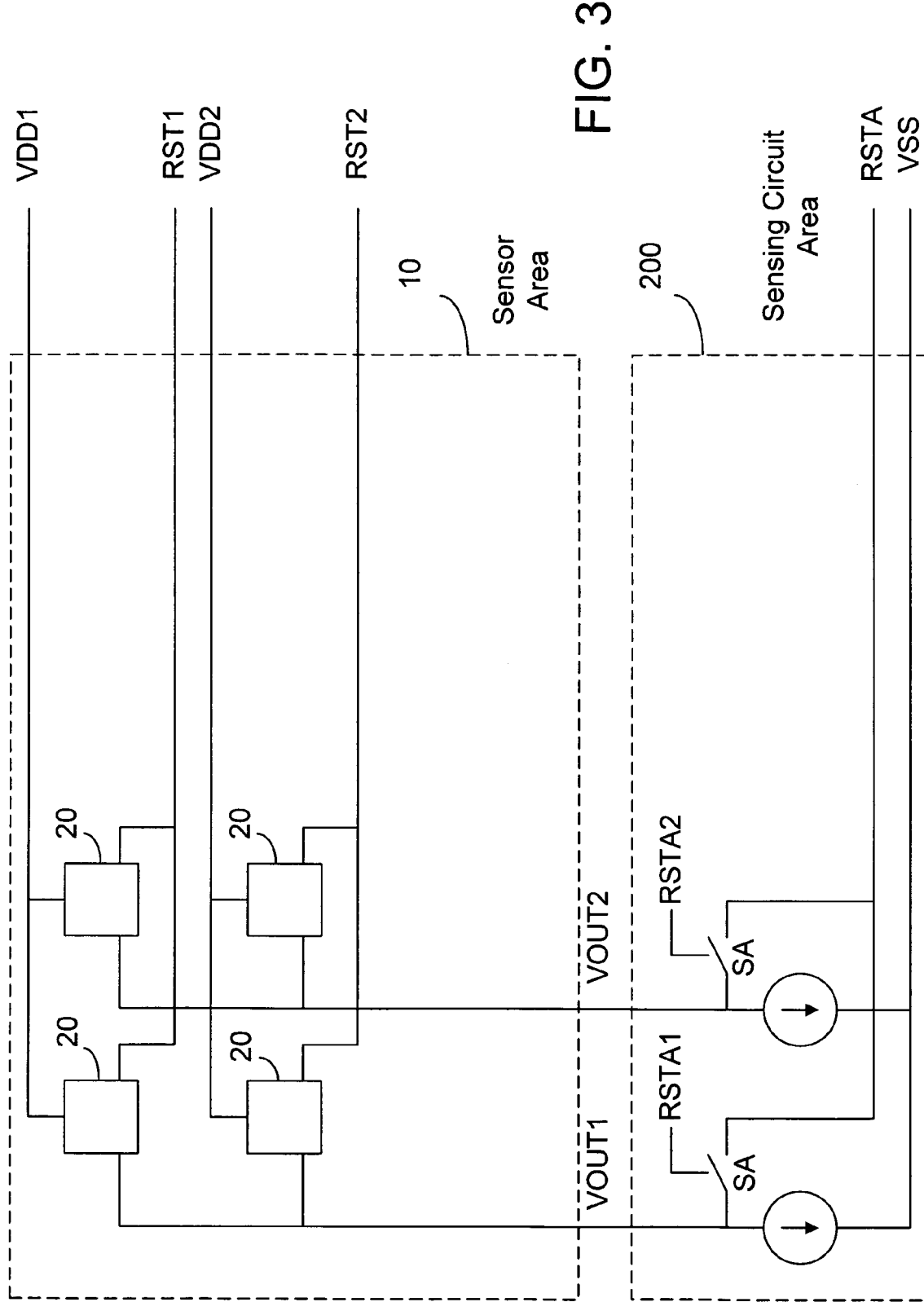
FIG. 3 shows a sensor area having an array of sensor elements, according to one embodiment of the present invention.

As can be seen in FIG. 3, the sensor area 10 comprises an array of sensor elements 20, connected to various voltage supply lines and reset signal lines from a control area (FIG. 1). As shown in FIG. 3, each row of sensor elements 20 is driven by a separate voltage supply VDDn and a reset signal RSTn, and each column of sensor element 20 is connected to an output line VOUTm in order to provide the output voltage from the sensor elements 20 to a sensing circuit 200.

Figure 2B:
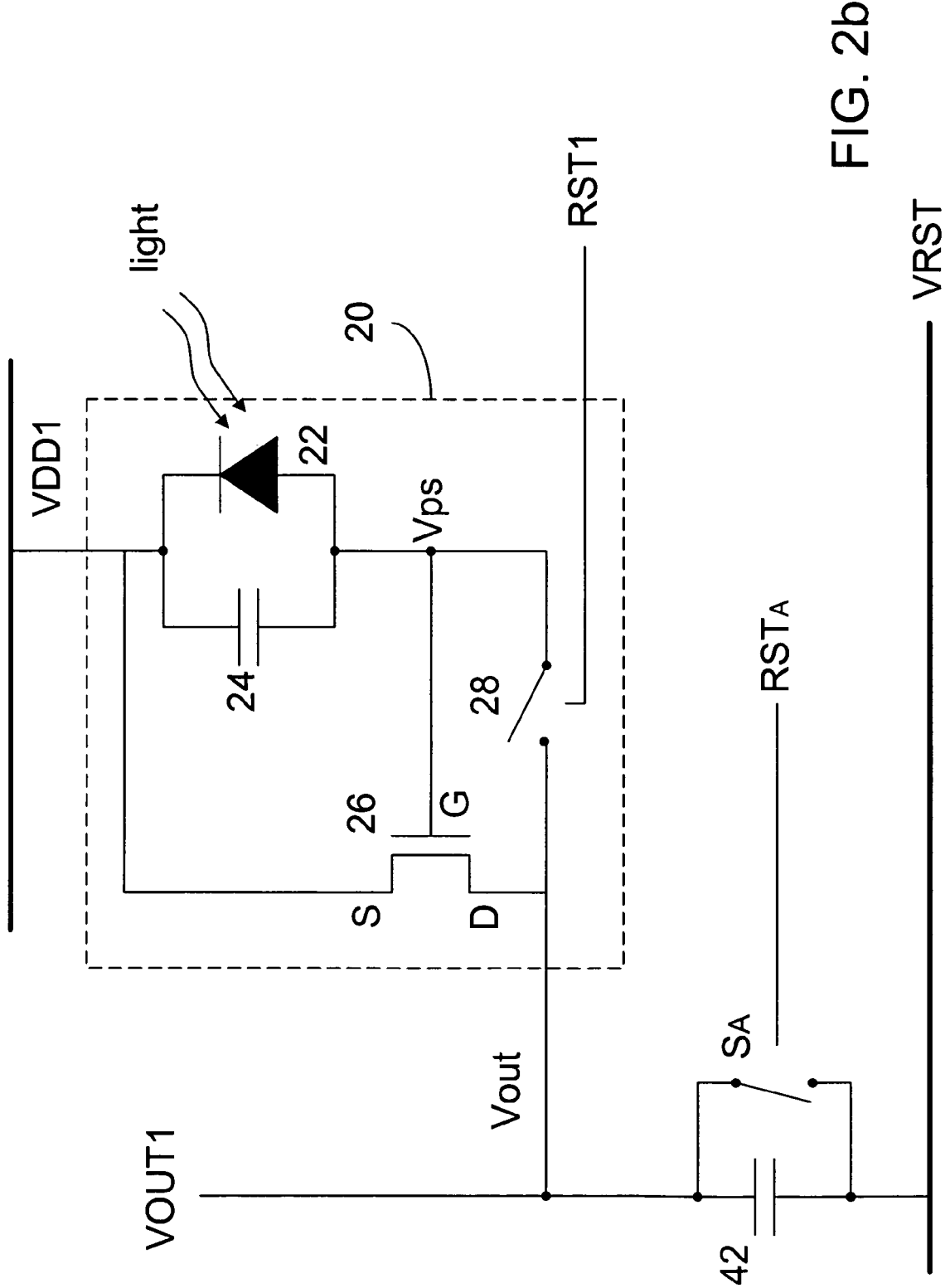
FIG. 2b shows the electronic components in a sensor element in the APS, connected to a different current source, according to another embodiment of the present invention.

A sensor element 20, according to one embodiment of the present invention, comprises a photo-detector or sensor 22, a capacitor 24, an amplifier 26 and a switching element 28, as shown in FIGS. 2a and 2b. The amplifier 26 can be a single transistor, Msf, for example. The photo-sensor 20 can be a photo-diode, for example, which is electrically connected with the capacitor 24 in parallel. One end of the photo-sensor 22 is electrically connected to a supply voltage having a voltage level VDD1, which is not a fixed value. Rather, VDD1 is in a high state when the sensor element is selected for sensing and VDD1 is in a low state when the sensor element is not selected for sensing (see FIG. 4). The other end of the photo-sensor 22 is connected to the gate terminal of the transistor Msf which is used as the active amplifier to amplify the photo-sensing signal at a sensing point Vps. The amplifier 26 can be source follower or a common-drain single amplifier, for example. But it can be in a common-collector configuration if a bipolar-junction transistor is used as the amplifier. After the photo leakage voltage signal at Vps is amplified by the amplifier 26, the amplified signal is output as Vout. Vout is connected to an external current source 40 which is connected to a voltage level VSS1, as shown in FIG. 2a. The output voltage Vout can be reset to a reset level VRST through an external switching element SA by a reset signal RSTA. The voltage level at Vps can also be reset to the voltage level VRST by a switching element 28 by a reset signal RST1, preferably in sync with reset signal RSTA.

FIG. 2b shows a different embodiment of the present invention, wherein the current source comprises a capacitor 42 connected to the switching element SA in parallel so that the output voltage Vout and the voltage level at Vps can be reset to the same reset level VRST.

Figure 4:
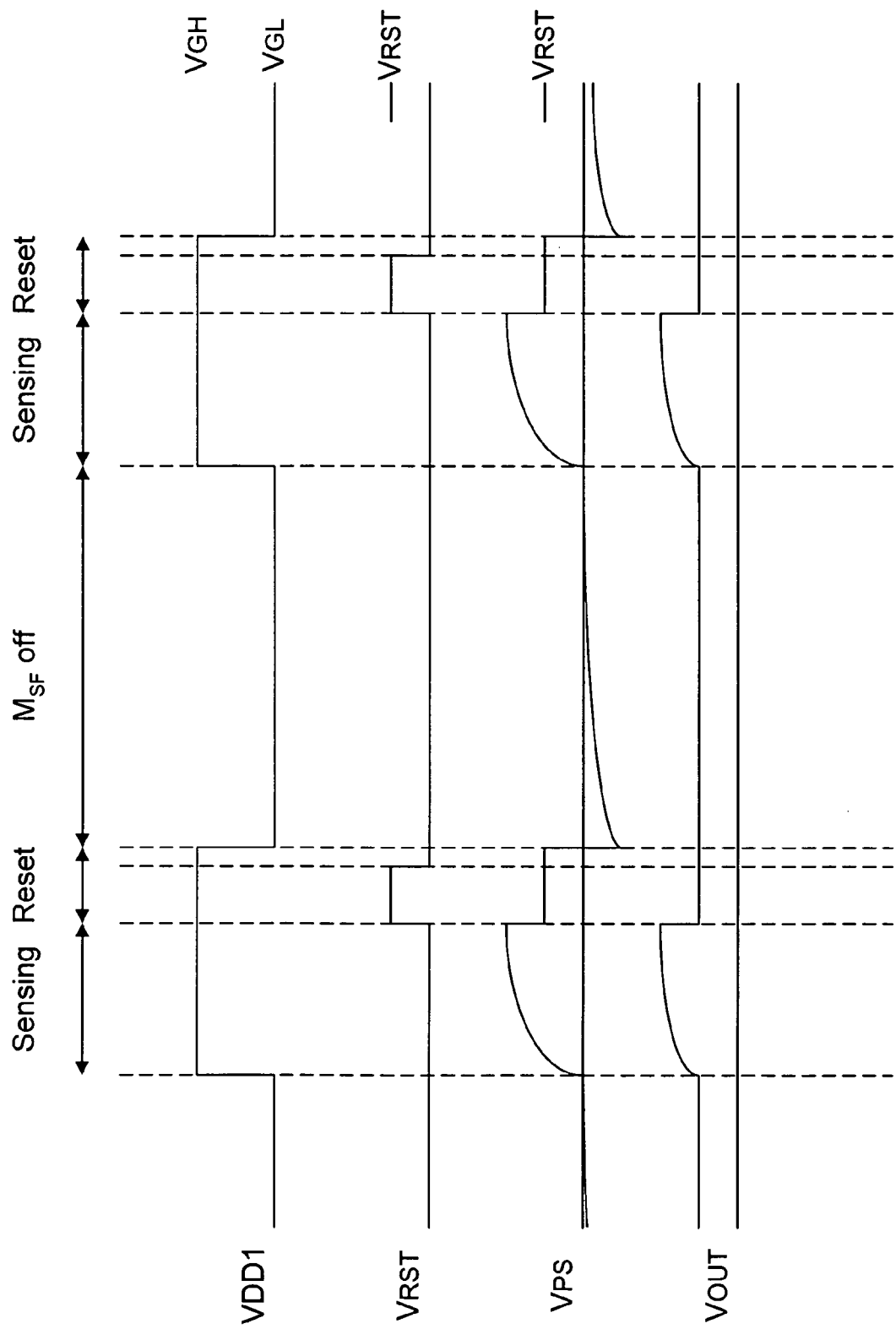
FIG. 4 is a time chart showing various signal levels in a sensor element.

The operation principle of the sensing element (see FIGS. 2a and 2b) is illustrated in FIG. 4. As shown in FIG. 4, VDD1 has two voltage levels, a high level Vgh and a low level Vgl. When VDD1 is at the Vgl level, the amplifier 26 is off. When VDD1 is at the Vgh level, the amplifier 26 amplifies the sensing signal Vps in the sensing period (period I-II in FIG. 4). In the time period I-II, the output voltage Vout increases with Vps, in general. It is understood that the amplitude of the sensing signal Vps in indicative of the light intensity received by the photo-sensor 22. When a sensor element 20 is touched, the sensing signal Vps and the output voltage Vout are reduced or changed. Thus, from the output voltage Vout, a touch event can be sensed.

In the time period II-III, the reset signals RST1 and RSTA are high, causing the switching elements 28 and SA to close (or in a conducting state), both the output voltage Vout and the signal Vps are equal to VRST. In the short period III-IV, the signal RSTA and RST1 are turned off, the output voltage Vout and signal Vps might change slightly. At point IV, VDD1 is switched to the low level Vgl, the signal Vps drops to a level substantially equal to VRST−(Vgh−Vgl). From point V until VDD1 becomes high again, Vps slowly increases but its level will not exceed Vgl.

As shown in FIGS. 2a and 2b, the output voltage Vout is read out as signal VOUT1 by an application specific integrated circuit (ASIC) in the sensing circuit area (FIG. 1), for example.

According to various embodiments of the present invention, VDD1 is operated in cycles with a high level Vgh and a low level Vgl. When the voltage level VDD1 is low, the amplifier 26 is in the non-conducting state. At the same time, the switching element 28 is operated in a non-conducting state, electrically isolating the sensing point Vps from the output Vout. As such, the output of the sensor element is unlikely to interfere with other sensor elements in the array.

Figure 5:
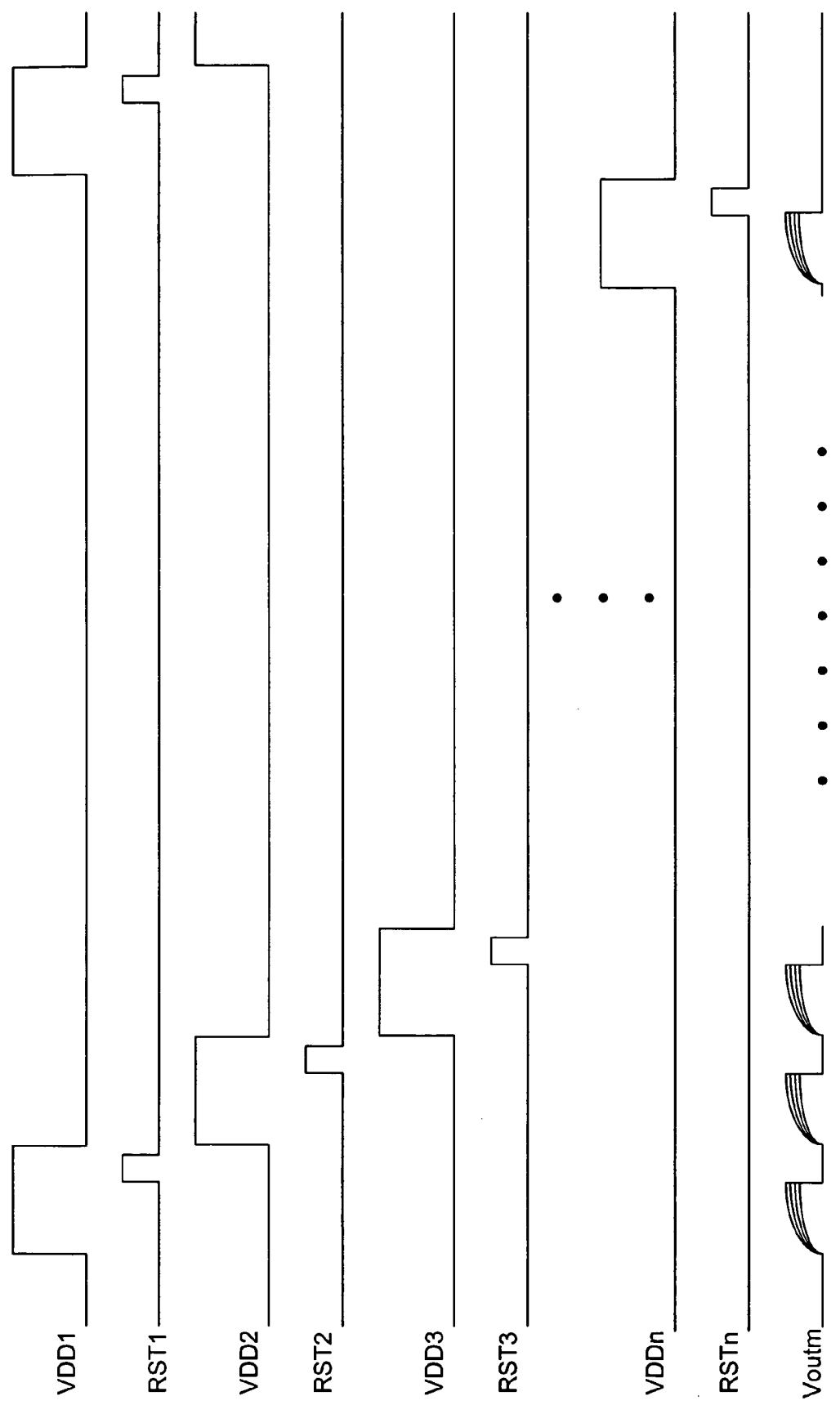
FIG. 5 shows the timing of various signals in a touch panel, according to one embodiment of the present invention.

The timing of the voltage supply VDD1 and the reset signal RST1, in relation to other voltage supply and reset signal is shown in FIG. 5. FIG. 5 shows the timing of the voltage supply signals and reset signals for a touch panel having n rows of sensor elements. For monitoring a touch event on the touch panel by scanning the output signals for all n sensor elements in any column of sensor elements, it is required to separately provide n voltage supply signals VDD1, VDD2, VDD3, . . . , VDDn to each row of the sensor elements. The time separation between two adjacent VDD1 signals must be sufficiently long so that all VDD2, VDD3, . . . , VDDn signals can be arranged before the next VDD1 is provided. As can be seen in FIG. 5, there is no time-overlapping between two adjacent voltage supply signals (VDD1, VDD2), (VDD2, VDD3), . . . , (VDDn, VDD1). As such, the read-out voltage output VOUTm for any column of sensor elements can unambiguously show the level of the voltage output of the sensor element in each row.

In summary, the present invention provides a touch screen having a sensor area comprising a plurality of sensor elements 20. Each sensor element 20 comprises an amplifier ($M_{SF}$, 26) having a first amplifier end (S), a second amplifier end (D) and a control end (G), the first amplifier end connected to a first voltage source (VDD1), the second amplifier end operatively connected to a voltage output (Vout), wherein the second amplifier end is configured for connection to a current source 40; and a photosensing element 22 having a first element end operatively connected to the first voltage source (VDD1), and a second element end (Vps) operatively connected to the control end of the amplifier, wherein the voltage output is operatively connected to a resetting element ($S_A$) for resetting the voltage output to a predetermined reset voltage ($V_{RST}$). The sensor element further comprises a first switching element (28) connected between the second element end (Vout) and the second amplifier end (Vps), the switching element operable in a conducting state and a non-conducting state.

According to various embodiments of the present invention, the resetting element ($S_A$) comprises a second switching element operable in a conducting state and a non-conducting state such that when the first switching element 28 is operated in the conducting state, the second switching element is also operated in the conducting state.

According to various embodiments of the present invention, the amplifier 26 comprises a transistor, the transistor comprising a source terminal, a drain terminal and a gate terminal, and wherein the first amplifier end is operatively connected to the source terminal, the second amplifier end is operatively connected to the drain terminal, and the control end is operatively connected to the gate terminal.

According to various embodiments of the present invention, the sensor element further comprises a capacitor connected between the first element end and the second element and of the photosensing element, wherein the photosensing element comprises a photodiode connected between the first element end and the second element end, and a capacitor connected in parallel with the photodiode.

Figure 6A:
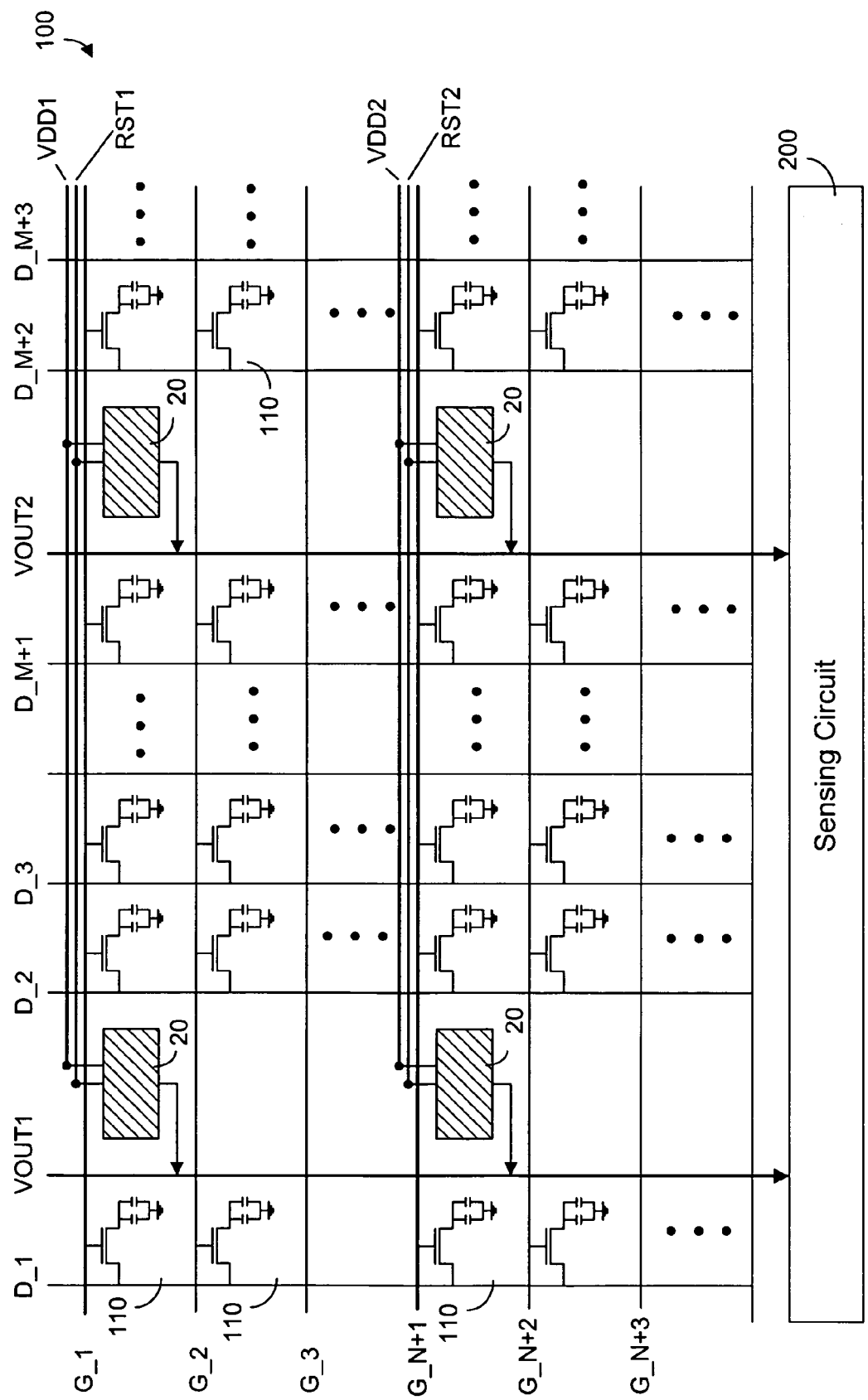
FIG. 6a shows an integrated touch screen having a plurality of active pixel sensors, according to one embodiment of the present invention.

It should be noted that, the sensor area (FIG. 1) can be implemented in a touch screen of a touch panel, or in a touch screen integrated into a display panel. As shown in FIG. 6a, the touch screen 100 is integrated with a display panel. The display panel has an array of pixels 110 driven by a plurality of gate lines G_1, G_2, . . . and a plurality of data lines D_1, D_3, . . . . The output voltages Vout1, Vout2, . . . of the touch screen are conveyed to a sensing circuit 200.

Figure 6B:
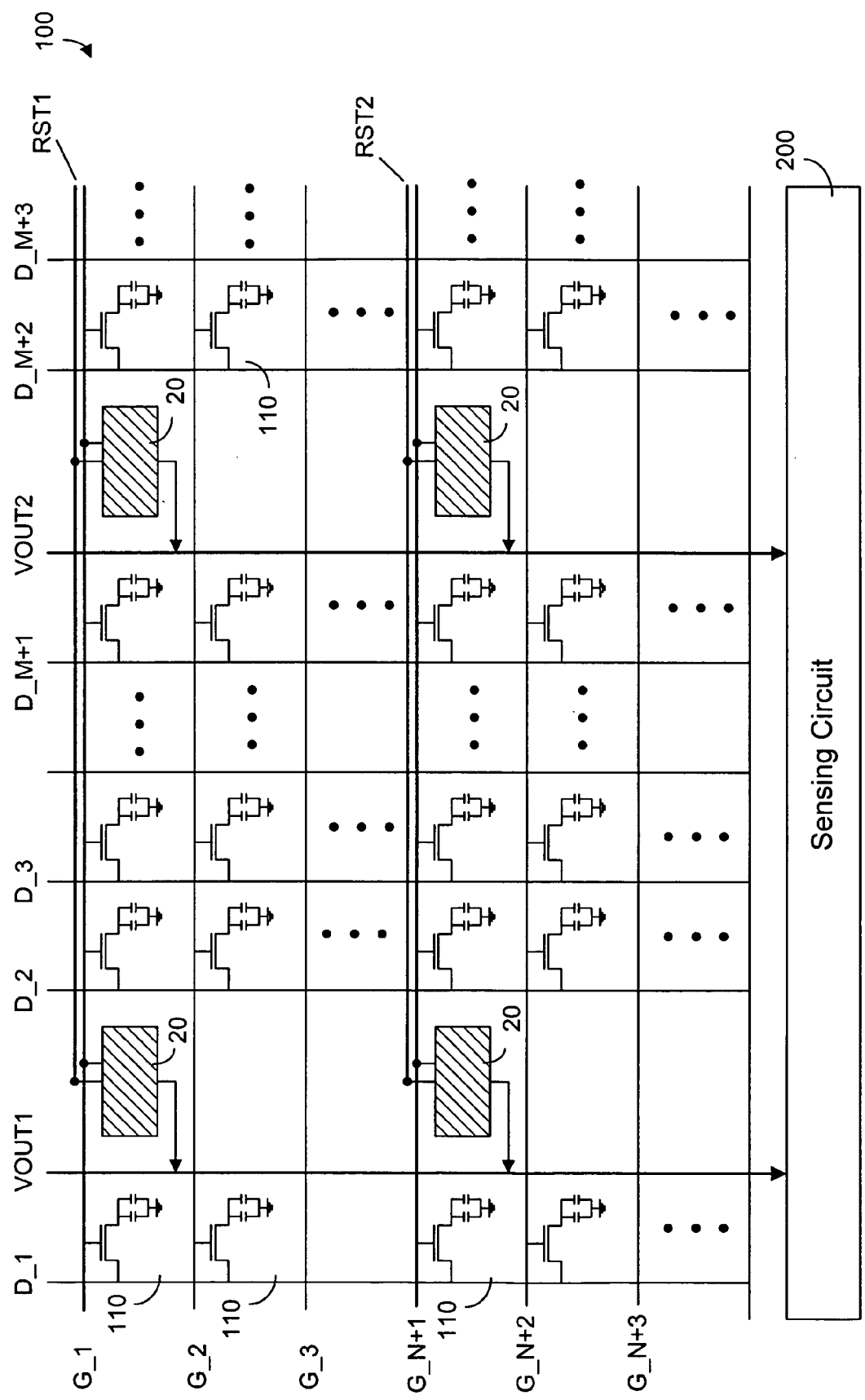
FIG. 6b shows an integrated touch screen having a plurality of active pixel sensors, according to another embodiment of the present invention.

It should be noted that the voltage supply signals VDD1, VDD2, . . . in a touch panel are also non-overlapping (see FIG. 5). It is known that the gate line signals G_1, G_2, . . . in a display panel are also non-overlapping. Therefore, it is possible to use the gate line signals in a display panel as the voltage supply signals to the touch panel, as shown in FIG. 6b. For example, the gate line signal G_1 can be used as VDD1; the gate line signal G_N+1 as VDD2; G_2N+1 as VDD3, etc. Depending upon the pixel resolution of the display panel relative to the arrangement of the sensor elements on the touch panel, N can be as small as 1.

The present invention also provides a method for touch sensing, which comprises arranging a plurality of sensor elements in a touch panel;

providing a photo-sensor in each of the sensor elements, the photo-sensor arranged to provide a sensing voltage indicative of a light level received by the photo-sensor in a sensing period;

amplifying the sensing voltage in the sensor element for providing an output voltage indicative of the sensing voltage in the sensing period; and resetting the output voltage to a predetermined voltage level in a reset period following the sensing period.

According to various embodiments of the present invention, the method further comprises resetting the sensing voltage to the predetermined voltage level in the reset period.

According to various embodiments of the present invention, the method further comprises disabling the photo-sensor in an off-period following the reset period so as to cause the sensing voltage to drop below the predetermined voltage level.

According to various embodiments of the present invention, the sensor elements are arranged in an array at a plurality of locations in the touch panel, the method further comprising:

measuring the output voltage from each of the sensor elements for providing a plurality of measured voltages; and comparing the measured voltages for determining a touch location in the touch panel.

Although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A sensor element, comprising:
    an amplifier having a first amplifier end, a second amplifier end and a control end, the first amplifier end connected to a first voltage source, the second amplifier end operatively connected to a voltage output for providing an output voltage, wherein the second amplifier end is configured for connection to a current source; and
    a photosensing element having a first element end operatively connected to the first voltage source, and a second element end operatively connected to the control end of the amplifier, wherein the voltage output is operatively connected to a resetting element, the resetting element connected to a reset voltage source providing a predetermined reset voltage for resetting the output voltage at the second amplifier end to the predetermined reset voltage, wherein the amplifier is operable in a first period and a second period, and the first voltage source comprises a first voltage level in the first period and a different second voltage level in the second period.

2. The sensor element of claim 1, further comprising:
    a first switching element connected between the second element end and the second amplifier end, the switching element operable in a conducting state and a non-conducting state, wherein the first switching element comprises a first switching end connected to the second element end, and a second switching end connected to the second amplifier end for resetting a voltage level at the second element end to the output voltage at the second amplifier end when the switching element operated in a conducting state.

3. The sensor element of claim 2, wherein the resetting element comprises a second switching element operable in a conducting state and a non-conducting state such that when the first switching element is operated in the conducting state, the second switching element is also operated in the conducting state.

4. The sensor element of claim 1, wherein the amplifier comprises a transistor, the transistor comprising a source terminal, a drain terminal and a gate terminal, and wherein the first amplifier end is operatively connected to the source terminal, the second amplifier end is operatively connected to the drain terminal, and the control end is operatively connected to the gate terminal.

5. The sensor element of claim 1, wherein the current source comprises
    a capacitor connected between the first element end and the second element end of the photosensing element.

6. The pixel sensor of claim 1, wherein the photosensing element comprising a photodiode connected between the first element end and the second element end, and a capacitor connected in parallel with the photodiode.

7. A photosensing array, comprising a plurality of sensor elements as claimed in claim 2, wherein the plurality of sensor elements are arranged in a plurality of rows, each row configured for receiving a row select signal for causing the switching element to operate in a conducting state.

8. A touch panel, comprising:
    a sensor area comprising a plurality of sensor elements;
    a control area; and
    a sensing circuit area, wherein each sensor element comprises:

an amplifier having a first amplifier end, a second amplifier end and a control end, the first amplifier end connected to a first voltage source from the control area, the second amplifier end operatively connected to a voltage output for providing an output voltage, wherein the second amplifier end is configured for connection to a current source in the sensing circuit area; and a photosensing element having a first element end operatively connected to the first voltage source, and a second element end operatively connected to the control end of the amplifier, wherein the voltage output is operatively connected to a resetting element, the resetting element connected to a reset voltage source providing a predetermined reset voltage for resetting the output voltage at the second amplifier end to the predetermined reset voltage, wherein the amplifier is operable in a first period and a second period, and the first voltage source comprises a first voltage level in the first period and a different second voltage level in the second period.

9. The touch panel of claim 8, wherein each sensor element further comprising:

a first switching element connected between the second element end and the second amplifier end, the switching element operable in a conducting state and a non-conducting state, wherein the first switching element comprises a first switching end connected to the second element end, and a second switching end connected to the second amplifier end for resetting a voltage level at the second element end to the output voltage at the second amplifier end when the switching element operated in a conducting state.

10. The touch panel of claim 9, wherein the resetting element comprises a second switching element operable in a conducting state and a non-conducting state such that when the first switching element is operated in the conducting state, the second switching element is also operated in the conducting state.

11. The touch panel of claim. 8, wherein the sensing circuit areas comprises means for measuring the voltage output of each of the sensor elements.

12. The touch panel of claim 8, wherein the plurality of sensor elements are arranged in a plurality of sensor rows, and wherein the control area is configured to provide a plurality of voltage supply lines to the sensor rows, each voltage supply line having a different voltage supply signal for providing the first voltage source to the sensor elements in a different one of the sensor rows.

13. The touch panel of claim 12, wherein the voltage supply signal in one of the voltage supply lines is non-overlapping with the voltage supply signal in another one of the voltage supply lines.

14. The touch panel of 8, wherein the plurality of sensor elements are arranged in a plurality of sensor rows, said touch panel further comprising a plurality of display pixels arranged in a plurality of pixel rows, and a plurality of gate lines for separately providing control signals to the pixel rows, wherein one or more of the gate lines are used for providing the first voltage source to the sensor elements in one or more of the sensor rows.

15. A method for touch sensing, comprising:

arranging a plurality of sensor elements in a touch panel;

providing a photo-sensor in each of the sensor elements, the photo-sensor arranged to provide a sensing voltage indicative of a light level received by the photo-sensor in a sensing period;

amplifying the sensing voltage in the sensor element for providing an output voltage indicative of the sensing voltage in the sensing period; and resetting the output voltage and the sensing voltage to a predetermined voltage level in a reset period following the sensing period, wherein the photo-sensor is connected to a voltage source comprising a first voltage level in a first period and a different second voltage level in a second period, and wherein the sensing period and the reset period occur only in the first period.

16. The method of claim 15, further comprising:

disabling the photo-sensor in the second period following the reset period so as to cause the sensing voltage to drop below the predetermined voltage level.

17. The method of claim 15, wherein the sensor elements are arranged in an array at a plurality of locations in the touch panel, said method further comprising:

measuring the output voltage from each of the sensor elements for providing a plurality of measured voltages; and comparing the measured voltages for determining a touch location in the touch panel.

18. The method of claim 15, wherein the touch panel comprises a reset voltage source for providing the predetermined voltage level.

* * * * *